March 24, 1964     K. P. STANABACK     3,125,931
METHOD FOR FORMING HELICAL FLUTES Filed March 16, 1961     2 Sheets-Sheet 1

INVENTOR.
KENNETH P. STANABACK
BY
*Price & Heneveld*
ATTORNEYS

March 24, 1964  K. P. STANABACK  3,125,931
METHOD FOR FORMING HELICAL FLUTES
Filed March 16, 1961  2 Sheets-Sheet 2

INVENTOR.
KENNETH P. STANABACK
BY *Price & Heneveld*
ATTORNEYS

United States Patent Office 3,125,931
Patented Mar. 24, 1964

3,125,931
METHOD FOR FORMING HELICAL FLUTES
Kenneth P. Stanaback, 3640 Breton Road SE.,
Grand Rapids, Mich.
Filed Mar. 16, 1961, Ser. No. 96,276
4 Claims. (Cl. 90—11.42)

This invention relates to machining, and more particularly to milling machine apparatus and a method for milling helical flutes on conical stock.

To machine constant angle helical flutes and adjacent grooves into a frusto-conical blank by conventional methods and apparatus is a very delicate, tedious, skillful and expensive operation. As the milling cutter proceeds from the smaller diameter end of the stock to the larger, the speed of linear feed must be constantly and carefully increased relative to stock rotation to maintain the constant helical angle. This is usually accomplished through carefully formed helical cam tracks with follower cams. The helical curvature of such a cam track necessarily increases from a sharp curvature to one approaching 180 degrees, see, e.g., my copending application Serial No. 72,220 filed November 28, 1960, entitled Machine for Forming Helical Flutes on Conical Milling Cutters. Such devices are very useful, but are limited in application since an entirely different and exact cam track must be formed for each change in stock taper or stock diameter, for example. Also, the maximum stock taper over which flutes may be formed is definitely limited due to the 180 degree limit in the helical cam track. To supply an elaborate set of delicate helical cam tracks is also expensive as can be readily appreciated.

As a consequence of these many expensive factors presently necessary to produce a fluted conical article such as an end mill, there has existed a great need for a simple, rapid, inexpensive method and for inexpensive milling apparatus for cutting helical flutes into a frusto-conical article.

It is accordingly an object of this present invention to supply such a much-needed simple method. It is a further object to provide a rapid, unique, and inexpensive method for milling helical flutes into a conical article blank, which method can be practiced on a conventional milling machine. Further, this method can be quickly, easily, and perfectly practiced on successive article blanks varying greatly either in diameter, in length, in taper, in the helical angle of the flute, or in any combination of these factors, which requires very little skill to practice as contrasted to prior art methods. This method also produces articles at a small fraction of the cost of those produced by previous methods and in a fraction of the time heretofore required. Also, it may be practiced to produce excellent products without any of the camming attachments, etc. used heretofore.

Further objects of this invention are to provide a conical flute milling apparatus that is relatively inexpensive; that is simple to operate; that requires no delicate and expensive camming attachments, and no shiftable carriages, and that will operate automatically.

These and other objects will be apparent from a scrutiny of the following specification when studied in conjunction with the drawings in which.

Basically, the invention comprises a method of machining constant angle helical grooves and adjacent helical flutes in a frusto-conical blank by completely abrogating all of the supplementary feeding and guiding equipment thought so essential in the prior art, and allowing the blank to actually rotate freely and provide its own guide and rotational feed. This is accomplished by climb-milling the tapered article at the desired helical angle, starting at the smaller end and proceeding to the larger end, while allowing the article to rotate on its centers and feed and guide itself. When the cut is being initiated at the smaller end, a positive rotative force is applied to assure correct initial rotation, after which the climb-milling provides a rotational feeding force while the blank is linearly fed into the cutter. Also, the article is positively restrained from too rapid rotation at the cut initiation until the groove and adjacent flute start forming, after which the flute actually serves as its own continuous guide.

The inventive apparatus involves the combination of a milling machine table, a milling cutter, a stock driving head, and a means such as a clutch mechanism capable of causing controlled constant speed rotative movement of the article blank with the driving head during a short interval of time, and of releasing the blank after the interval of time for rotation of the blank independently of the driving head.

Figure 1:
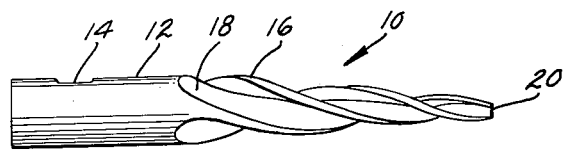
FIG. 1 is an elevational view of a typical fluted tapered article.

Referring now to FIG. 1, a typical fluted conical article, i.e., a tapered end mill 10 includes cylindrical shank 12 with a conventional set-screw flat 14 and a plurality of flutes 16 with intermediate grooves 18. The height of the flutes and the corresponding depth of the grooves increases from smaller diameter end 20 to the larger end adjacent shank 12. The width of the flutes increase also with the increasing diameter. The helical angle of the grooves and flutes is constant over the entire tapered area.

To mill the constant angle flutes on the frusto-conical article involves a complex mathematical relationship between the linear feed rate and the rotational feed rate of the blank into the cutter, and involving the increasing diameter of the work piece blank, the increasing depth of the groove, and the maintenance of the constant helical angle.

It has been discovered by the present inventor that the gear trains, the delicate increasing curvature helical cams and other related apparatus thought so essential heretofore may be completely done away with by utilizing a very simple, unique, and unconventional method which necessarily includes the discarding of prior teachings in the trade. In practicing the novel method, the mathematical relationship between the feed is not analyzed and applied to a complex feeding apparatus but is allowed to solve itself on the machine during the milling.

In contrast to prior art methods where the linear feed rate was increased while the rotational feed remained constant from the smaller to the larger end, in the present method the linear feed rate remains constant while the rotational speed diminishes with milling from the smaller to the larger end of the blank.

Figures 2, 8:
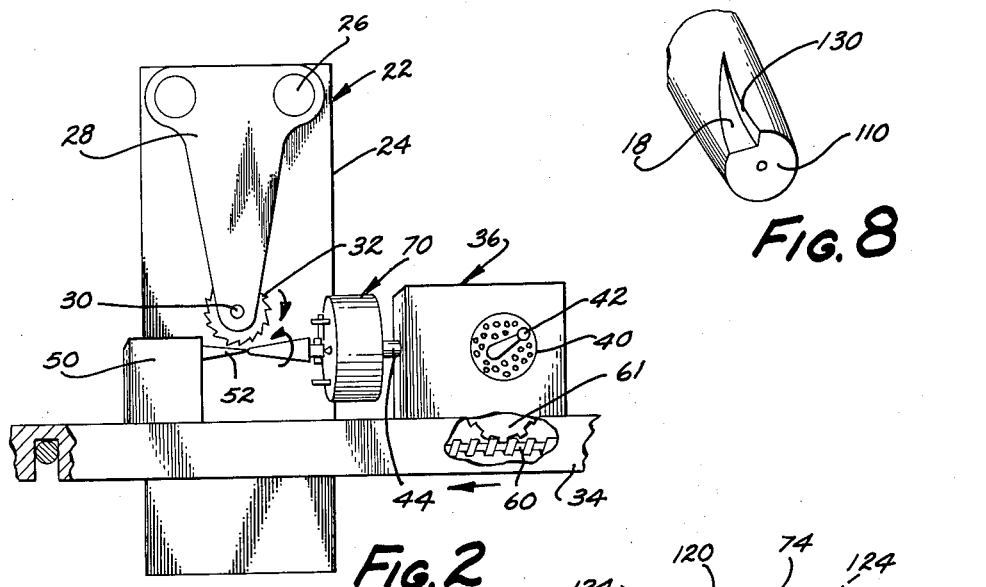
FIG. 2 is an elevational view of the milling apparatus of this invention.
FIG. 8 is a fragmentary perspective view of the frusto-conical article of FIG. 7 with the cut started.
Figure 6:
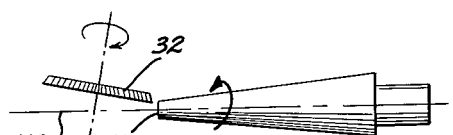
FIG. 6 is a fragmentary plan view of the milling cutter and frusto-conical article blank of FIG. 2.
Figure 7:
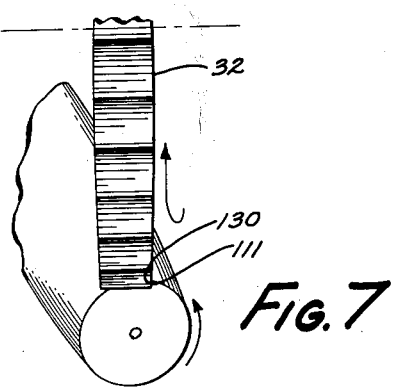
FIG. 7 is a fragmentary perspective view of the cutter and blank after the helical groove has been started.

Referring to FIG. 2, a conventional milling machine 22 includes a housing 24 enclosing the driving mechanism (not shown), conventional overhanging arbors 26 extending outwardly from housing 24, conventional extended arbor support 28, conventional driven arbor 30, milling cutter 32 keyed to arbor 30 as is customary, and work table 34 movable laterally of housing 24 by screw 60 and shiftable angularly in a horizontal plane with respect to the housing. Mounted upon table 34 is a conventional indexing mechanism 36 which is geared to screw 60 as by spur gear 61. The indexing mechanism 36 includes index plate 40, rotatable indexing handle 42, and drive shaft 44 connected to driving head 70. Also mounted on table 34 is a tail stock 50 including center 52. The indexing mechanism 36 is connected to lead screw 60 in the table 34 so that the rate of rotation of shaft 44 will be controlled by the lateral speed of table 34 into cutter 32 and will normally be at a constant rate of speed. Table 34 is positioned at an acute angle with respect to housing 24 and cutter 32 of machine 22 to obtain the desired angle between the blank and the cutter as illustrated by FIGS. 6 and 7. Cutter 32 is depicted as a bevel cutter but may be of another type depending upon the geometry desired of the grooves.

Figure 4:
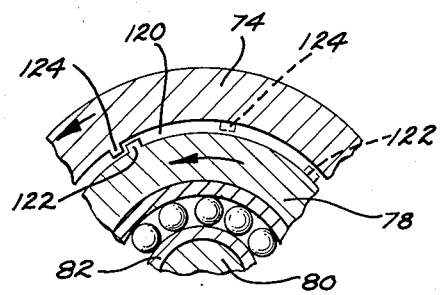
FIG. 4 is a fragmentary sectional view of the driving head taken on plane IV—IV of FIG. 3.
Figure 3:
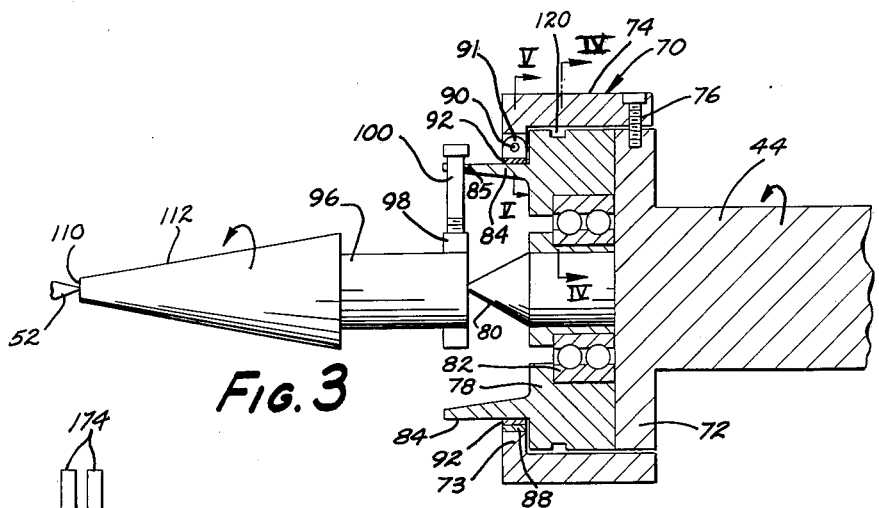
FIG. 3 is an enlarged sectional view of the driving head in the apparatus of FIG. 2.
Figure 5:
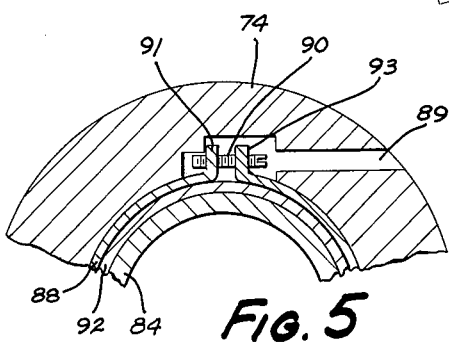
FIG. 5 is a fragmentary sectional view taken on plane V—V of FIG. 3.

Driving head 70 (FIG. 3) includes transverse back-up plate or disc 72 which is integral with and driven by shaft 44, and is in turn secured to annular collar 74 as by bolts 76. Within collar 74 is located the face plate 78 and center 80. Center 80 is fastened securely to back-up plate or flange 72 to provide support for face plate 78 through bearings 82. If desired, center 80 may be rotatably mounted with respect to disc 72. This could be done by having a projection extending from the back-up plate 72 into the central portion of center 80 to support it. The center itself could then be fixed to the face plate with both of them being rotatably mounted on the projection. Extending axially from face plate 78 is an annular axial rib 84 which has a plurality of spaced slots 85 into which bolt 100 may fit and form a rotational driving connection. Between the inner periphery of inward radial projection 73 on collar 74 and the outer peripheray of axial rib 84 is positioned an annular piece of felt 92 (FIGS. 4 and 5). Around and in contact with the felt and secured to collar 74 is an annular clamp 88 similar to a common hose clamp which may be radially tightened down upon felt 92 by turning bolt 90 between the mating flanges 91 and 93 through opening 89. Flange 91 is preferably brazed to collar 74. Upon tightening the clamp, the frictional contact between collar 74 and face plate 78 is increased to produce a clutching action therebetween.

Mountable on center 80 is the shank 96 of a frusto-conical work piece blank to be machined. Ring 98 is secured to the shank 96 for the machining process as by stud 100 which co-acts with slotted rib 84 of face plate 78 to effect positive angular coordination between the face plate and the blank. Center 52 supports the smaller diameter end 110 of the tapered portion 112 of the blank to be machined. The fragmentary sectional view in FIG. 4 depicts the relationship of collar 74 to face plate 78 and center 80, the latter mounted on bearings 82. Annular slot 120 in the outer periphery of face plate 78 includes an outwardly directed radial tooth 122. Collar 74 also has an inwardly directed radial tooth 124 which can abut tooth 122. When the teeth are adjacent each other, face plate 78 will not be allowed to rotate counterclockwise (FIG. 4) any faster than the positive rotative speed of collar 74 as will be explained more fully hereinafter. These teeth are but one type of positive connection which could be used. Others will readily be conceived by those in the art once the function thereof is understood.

*Method and Operation*

The novel method of forming the flutes on a frusto-conical blank will be evident as the following description of the operation of the apparatus unfolds.

When it is desired to cut a plurality of spaced helical grooves to form helical flutes in a frusto-conical blank and obtain a fluted product, such as end mill 10 of FIG. 1, holding ring 98 is slipped onto the cylindrical shank of the blank and stud 100 is screwed into the ring and tightly against the shank to hold the ring on the blank. Next, the work piece blank is placed between the tail stock center 52 and center 80 with stud 100 being fitted into slot 85 provided in the axial edge of annular axial rib 84. Next, milling machine 22 is started to rotate cutter 32 in a clockwise direction for climb milling as depicted in FIG. 2. The desired angle of cutter 32 with respect to the work piece on table 34 is set as depicted in FIG. 6 since this determines the constant helical angle of the flutes. This is done by horizontally swiveling table 34 with respect to the cutter and locking it in the desired position. Next, the constant linear feed of the table 34 is started to move the work piece to the left and into the cutter, with the blank simultaneously being rotated at a constant speed into the cutter through stud 100, face plate 78, felt clutch 92, collar 74, shaft 44 and indexing mechanism 36 geared to the table drive screw 60. The rotational rate is in proportion to the table feed rate due to the positive drive connection between screw 60 and gear 61 of the indexing mechanism. Thus at the cut initiation on the small end of the blank, the latter is positively rotatably driven at a particular constant starting speed to obtain the proper start of the helical cut. The angle of the cutter and the rotational speed of the stock will be pre-set according to the diameter of the small end of the stock and the spiral angle desired. Since the climb milling cutter may tend to literally climb up on the article and rotate it too rapidly at the very beginning of the cut, tooth 124 on collar 74 serves as a restraining member to tooth 122 on face plate 78 and thus the blank is prevented from rotating too rapidly at the cut initiation. After the groove has been formed a small distance to provide a wall surface 130 on the leading edge of the groove and the flute being formed (FIGS. 7 and 8), conventional milling machine principles are discarded and the climb milling operation is allowed to proceed all by itself completely independent of positive driving forces and of positive restraining forces. Vertical surface 130 takes over the rotational speed regulation and acts as a continuous guide for the milling cutter. This is done by the constant contact between the lateral surfaces 111 (FIG. 7) of the receding cutter teeth against surface 130. With the climb milling teeth of the cutter imparting a continuous rotational force tending to feed the blank into the cutter, the constant bearing of flat leading edge surface 130 against the edge of the cutter teeth accurately controls the speed of rotation. As the diameter of the blank gets larger and larger, the rotational speed constantly diminishes automatically by virtue of this unique self-regulating aspect on guiding edge 130. The milling is now completely independent and freely rotating with respect to the constant speed collar by slippage occurring at the felt clutch. Further, it is not influenced by tooth 124 since it has moved away from and continues to move an ever increasing amount away from tooth 122 as the two rotate at different speeds. After a few revolutions, tooth 124 will assume a position with respect to tooth 122 as depicted for example in phantom in FIG. 4. Therefore, the collar acts as a driver and the cooperating teeth act as a restraining force only during the very initial portion of the operation. The cutter is then allowed to proceed entirely on its own to form the groove of ever increasing depth on the conical blank which rotates at a constantly decreasing speed. The flute itself being formed actually governs the rotational speed. This is in sharp contrast to prior art methods wherein the rotational feed of the blank was tightly controlled and wherein the linear feed rate was predetermined according to a complex mathematical function and constituted an ever increasing value as coordinated with a constant rotational speed.

In the present method, since the speed of collar 74 is constant due to the positive connection to screw 60, the decreasing rotational speed or feed of the blank (and attached face plate 78) must decrease independently of the collar. Slippage of felt 92 around projection 84 allows this differential in speed between the collar and the face plate.

When the groove is completely cut to cylindrical shank 12, the linear table feed is reversed to back cutter 32 off the work piece in the newly-formed groove. The backing cutter rotates the blank in the opposite direction. As the cutter again approaches the small end of the taper it has a tendency to snip off the tiny ends of the newly formed flute instead of causing the blank to rotate the last little bit. At this time, however, tooth 124 in its rearward motion has just caught up to tooth 122 again by closing the gap therebetween since it has rotated rearwardly at a faster rate than tooth 122. The abutment of tooth 124 against tooth 122 imparts positive rearward rotation to the blank at the very end of the back off. This allows the cutter to pass out of the newly formed groove neatly without nipping the tiny end of the newly formed flute.

*Modifications*

When machining helical flutes into frusto-conical blanks having a very small diameter, especially at the small diameter end, a slightly modified form of driving head may be used. This modified apparatus may be used on larger blanks too, if desired. It operates upon the same general principles as the previously described structure, i.e., positive driving and positive restraining at the cut initiation, followed by release of these actions to allow rotation of the blank by the climb milling cutter, and to allow self-regulation of the rotational speed after the cut has been initiated.

In the modified structures, these two functions are incorporated into the same structral member as compared to the frictional clutch driver and the abutting teeth restrainer above. Also the disengagement of the clutch is absolute as compared to the continuous frictional drag of the felt during the entire cutting in the above described structure but which is overcome after the cut initiation.

Figure 9:
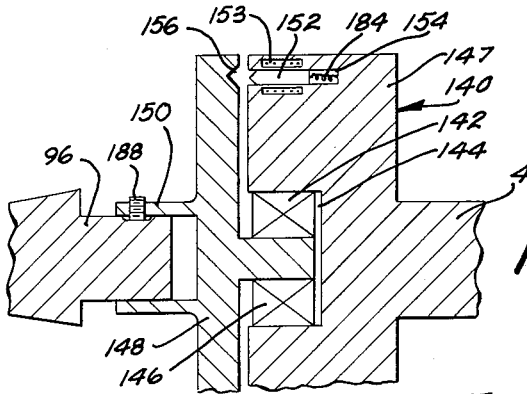
FIG. 9 is a fragmentary sectional view of one modified form of driving head.

The driving head 140 in FIG. 9 is driven from article indexing drive shaft 44 as before and comprises back plate 147 and face plate 148. A recess 144 in back plate 147 is provided for reception of bearings 142. Within these bearings is rotatably mounted shaft 146 of the face plate 148. A cylindrical chuck 150 or the like receives and retains blank 96. This chuck and driving arrangement may be modified in various obvious ways to effect the positive driving connection between plate 148 and the blank 96 and to obtain independent rotation of plate 148 with respect to back up plate 147 and shaft 44.

These two plates 147 and 148 may be positively rotatably interconnected with a reciprocable pin 152, with pressurized fluid being injected into chamber 154 or with activation of a suitable solenoid 153 to shift pin 152 to the left into recess 156 against the bias of tension spring 184. Thereby the helical cut may be initiated until vertical face 130 is formed sufficiently to act as a guide for the cutter. At that time pin 152 is retracted by releasing the solenoid or fluid pressure to allow tension spring 184 to shift pin 152 to the right and again allow free rotation of the blank on face plate 148.

Figure 11:
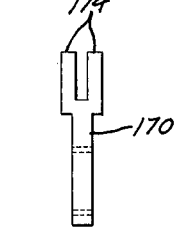
FIG. 11 is a plan view of the clutching fork in the driving head illustrated in FIG. 10.
Figure 10:
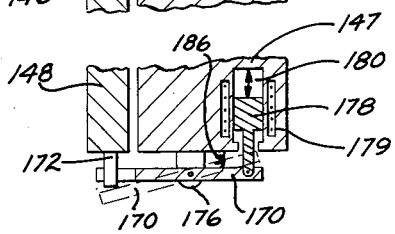
FIG. 10 is a fragmentary sectional view of a second modified form of driving head.

A second modification of a positive driver and restrainer is depicted in FIG. 10. The figure illustrates the lower portion of the driving head shown in FIG. 9 including bearings 142 in recess 144 and the chuck 150 but not including pin 152. Fork 170 (see also FIG. 11) pivots on mounting plate 176 attached to back up plate 147. The fork is pivotally connected on one end to piston 178 in chamber 180 and straddles with its legs 174 on its opposite forked end fixed pin 172 extending radially from face plate 148. Solenoid 179 or alternatively fluid pressure in chamber 180 actuates fork 170 to pivot it from the position shown in phantom to that in solid against the bias of tension spring 186 to straddle pin 172 and act simultaneously as a positive driving force and as a positive restraining force.

In machining a helical groove into a frusto-conical article using these structures, the cylindrical shank of the article 96 is fitted into chuck 150 and secured by set screw 188, followed by climb milling at a desired angle on the small end of the article. During the initial cutting stages either pin 152 or alternatively fork 170, whichever is used, is activated to interlock face plate 148 to back up plate 147 to cause positive driving and also positive restraining of the blank to control its rotative movement for a short interval of time. After a short length of surface 130 has been formed, the pin 152, or fork 170, is disengaged to allow the cutter to climb mill independently thereof. The blank must be freed of these devices very shortly after the cut initiation or the rotational speed of the blank will not be allowed to decrease and the blank will be ruined by distortion of the groove angle.

After the first complete groove is formed, the cutter is backed off. Pin 152 or fork 170 is engaged just before the cutter backs off the smaller diameter end to positively drive the article and avoid nipping off a part of the flute just formed. To cut the next flute of a desired plurality thereof, the indexing hand 42 is rotated on plate 40 and set in one of the holes as is conventional in the art to evenly space the flutes. Thereafter the remaining grooves and adjacent flutes are machined as the first.

By using these highly unorthodox techniques, helically fluted conical articles with a very accurate and very uniform helical angle can be inexpensively and quickly produced by one having relatively little skill in the art. The method is very simple in operation, to be sure, even though it accomplishes an operation embodying a complex mathematical relationship. Indeed, its very simplicity, resulting from its unorthodox approach, is what causes it to be such a marked advance in the age-old milling art.

Various other obvious modifications will be apparent to those in the milling art, once this is disclosed to them. Such modifications are deemed to be within the spirit of this invention which is to be limited only by the scope of the appended claims and the reasonable equivalents thereto.

I claim:

1. A method of forming helical flutes on a frusto-conical blank comprising the steps of, providing an elongated, solid, frusto-conical work piece blank, any transverse section to the axis thereof of which is circular, positioning a toothed milling cutter adjacent one end of a frusto-conical blank and at an acute angle with respect to the axial center line thereof; forceably rotating said blank with a driving force; simultaneously climb milling said blank at said angle over a small portion to initiate a groove and an adjacent flute edge with a wall surface, then allowing said blank to rotate free of said driving force while continuing said climb milling with said blank providing its own rotational speed regulation and angle guide by the constant contact of the edge of cutter teeth with said wall surface as the climb milling progresses; and repeating this sequence a plurality of times to obtain the desired number of flutes.

2. A method of forming a helical flute on a frusto-conical blank comprising the steps of, providing an elongated, solid, frusto-conical work piece blank, any transverse section to the axis thereof of which is circular, rotatably supporting said blank; positioning a milling cutter adjacent one end of said blank and at an acute angle with respect to the center line of said blank; forceably rotating said blank with a positive force toward said cutter; simultaneously linearly feeding said blank toward said cutter at a constant rate of speed; climb milling said small end until a small portion of a guiding flute edge wall surface is formed in said blank; then allowing said blank to rotate free of said positive force while continuing to climb mill said blank until a helical flute of the desired length is formed with contact of the edge of the cutter teeth on said wall surface providing the rotational speed regulation and angle guide; backing said cutter off said blank along the formed helical flute while allowing said blank to freely rotate away from said cutter; and then forceably rotating said blank away from said cutter as said cutter approaches said small end to prevent damage of the newly formed flute surface.

3. A method of milling a helical groove into a frusto-conical blank comprising the steps of, providing an elongated, solid, frusto-conical work piece blank, any transverse section to the axis thereof of which is circular, rotatably supporting said blank; positioning a toothed milling cutter adjacent the small end thereof and at an acute angle with respect to the center line of the blank; linearly feeding said blank into said cutter; simultaneously forceably rotating said blank toward said cutter with a first positive force, and positively restraining said blank from too rapid rotation with a second positive force; climb milling said small end a short distance to form the beginning portion of a groove having a flat leading wall surface; then releasing said positive restraining force while continuing to climb mill said groove with contact of the edge of the cutter teeth with said flat wall surface acting as a rotational speed regulator independent of said positive rotational force.

4. A method of milling a helical groove into a frusto-conical blank comprising the steps of, providing an elongated, solid, frusto-conical work piece blank, any transverse section to the axis thereof of which is circular, rotatably supporting said blank; positioning a toothed milling cutter adjacent the small end thereof and at an acute angle with respect to the center line of said blank; linearly feeding said blank into said cutter; simultaneously forceably rotating said blank toward said cutter and forceably restraining said blank from too rapid rotation with a common member; climb milling said small end a short distance to form the beginning portion of a groove having a flat leading wall surface; then releasing said positive force while continuing to climb mill said groove with said climb milling imparting a constant rotational force to said blank, and the rotational speed regulation and angle guide being achieved by the contact of the edge of the cutter teeth with said flat wall surface regulating the maximum rotational speed thereof.

References Cited in the file of this patent

UNITED STATES PATENTS

| | | |
|---|---|---|
| 888,984 | Fell | May 26, 1908 |
| 1,578,589 | Earl | Mar. 30, 1926 |
| 2,410,261 | Bradner | Oct. 29, 1946 |
| 2,738,711 | Carlson et al. | Mar. 20, 1956 |
| 2,923,206 | Kovac | Feb. 2, 1960 |
| 2,979,993 | Hedstrom | Apr. 18, 1961 |

FOREIGN PATENTS

| | | |
|---|---|---|
| 14,198 | Great Britain | 1915 |